United States Patent [19]

Hilborn

[11] Patent Number: 4,788,741
[45] Date of Patent: Dec. 6, 1988

[54] KEYED MOUNTING ASSEMBLY FOR LOCKABLE SWIVEL CASTER

[76] Inventor: Robert R. Hilborn, 870 Whittier Cres., Mississagua, Ontario, Canada, L5H 2X3

[21] Appl. No.: 90,010

[22] Filed: Aug. 27, 1987

[30] Foreign Application Priority Data

Jul. 17, 1987 [CA] Canada ................................. 542431

[51] Int. Cl.⁴ ........................................... B60B 33/00
[52] U.S. Cl. ..................................... 16/35 R; 16/38; 16/43
[58] Field of Search ................ 16/38, 39, 35 R, 40, 16/42 T, 43

[56] References Cited

U.S. PATENT DOCUMENTS

| | | | |
|---|---|---|---|
| 75,080 | 3/1868 | Twining | 16/43 |
| 1,632,435 | 6/1927 | Darnell | 16/38 X |
| 1,899,394 | 2/1933 | Noelting et al. | 16/38 |
| 4,035,864 | 7/1977 | Schroder | 16/35 R |
| 4,361,930 | 12/1982 | Seesengood | 16/38 |
| 4,385,414 | 5/1983 | Damico | 16/35 R |

Primary Examiner—Fred A. Silverberg
Assistant Examiner—J. Reed Batten, Jr.
Attorney, Agent, or Firm—Riches, McKenzie & Herbert

[57] ABSTRACT

The caster has a generally cylindrical stem which is received in a well in a socket which, in turn, is securely received in the bottom of the hollow leg. The stem has a longitudinal groove which receives an inwardly projecting rib on the socket. This prevents rotation of the stem in the socket so that when the swivel braking mechanism on the caster is actuated, the wheel cannot pivot relative to the vertical axis. This economical mechanism facilitates installation and replacement of the caster.

8 Claims, 2 Drawing Sheets

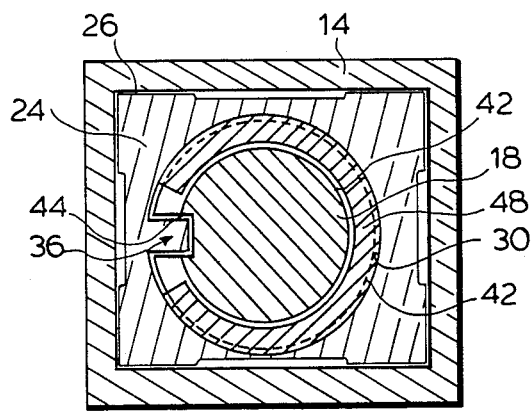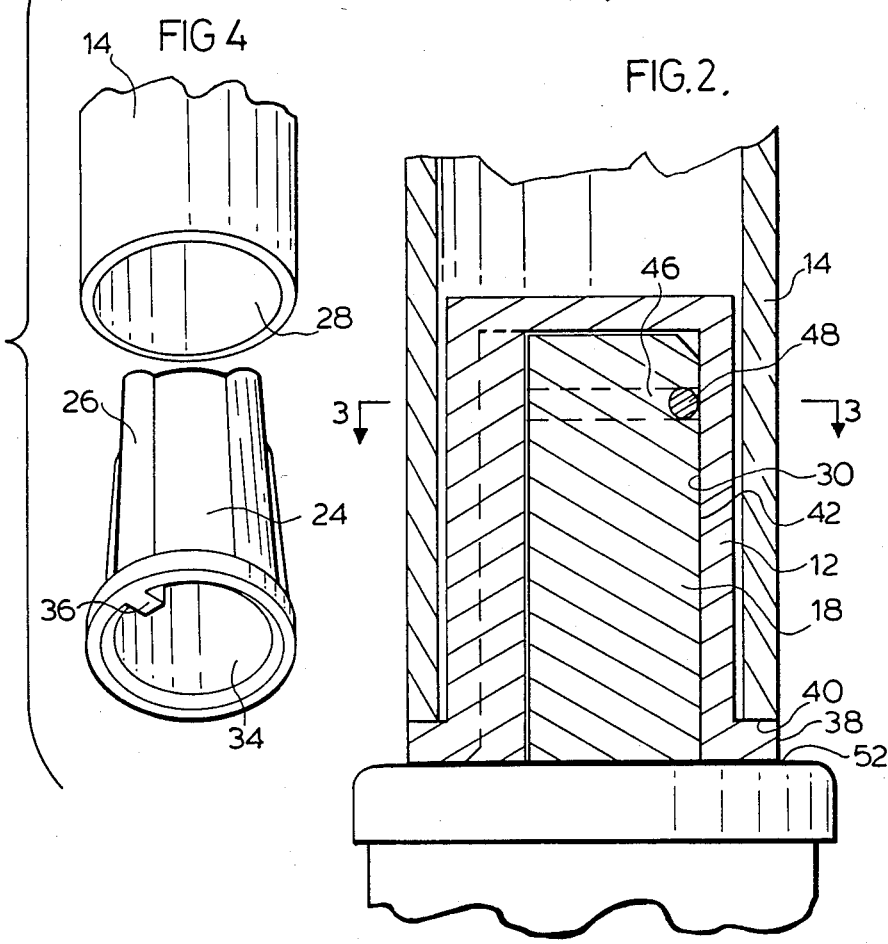

KEYED MOUNTING ASSEMBLY FOR LOCKABLE SWIVEL CASTER

BACKGROUND OF THE INVENTION

This invention relates generally to casters for furniture, such as hospital beds, and more particularly to an improved assembly for removably mounting a lockable swivel caster of a known type on a hollow leg.

Rotatable or wheeled casters are well known and sockets for mounting the casters are also well known. For instance, U.S. Pat. No. 75,080 to Twining which issued Mar. 3, 1868 shows a socket for receiving the stem of a caster which is driven into the wooden leg of a bed. While many improvements have been made to this type of socket over the intervening years, generally the cylindrical stem of the caster has been free to rotate in a cylindrical hole or well in the socket mounted in the leg.

More recently, lockable swivel casters have been developed with mechanisms for locking against swiveling of the caster as well as rotation of the wheel. Examples of these are shown in U.S. Pat. Nos. 4,035,864 to Schroder which issued July 19, 1977 and 4,385,414 to Damico which issued May 31, 1983. In order to prevent rotation about the vertical axis in the locked position, it is necessary that the stem of the caster be rotatably fixed relative to the leg of the bed. As seen in U.S. Pat. No. 4,385,414 mentioned above, this is achieved by the caster having a square stem which is mounted directly in the leg of the bed. In the normal situation where the caster has a cylindrical stem and a socket is used, the socket and the stem are fixed together by drilling a hole laterally through them and inserting a pin. However, this has the disadvantages of being more difficult and costly to do and being more troublesome to remove the caster for repair or replacement.

SUMMARY OF THE INVENTION

Accordingly, it is an object of the present invention to at least partially overcome the disadvantages of the prior art by providing an assembly wherein standard dimension components can be used to easily and economically removably mount a caster on a hollow leg with the stem of the caster being locked against rotation relative to the leg. To this end, in one of its aspects, the invention provides an improved rotatable support assembly for mounting on the bottom of a generally vertical hollow leg comprising a caster having an upwardly projecting elongated generally cylindrical stem with an upper end and a wheel which rotates and swivels relative to the stem, the caster including brake means which are lockable to prevent the wheel swiveling relative to the stem, the stem having an outer surface with a groove extending longitudinally from its upper end, and a socket having a body with an outer surface and an inner surface which defines a generally cylindrical central hole with a downwardly open mouth, the body having a key which projects into the hole, the body being receivable in the hollow leg wherein the outer surface frictionally engages the hollow leg to secure the socket in place, the stem of the caster being removably receivable in the hole in the socket with the key received in the longitudinal groove in the stem whereby the stem is prevented from rotating in the hole.

Further objects and advantages of the invention will appear from the following description taken together with the accompanying drawings.

BRIEF DESCRIPTION OF THE DRAWINGS

FIG. 2 is a partial sectional view showing the assembly mounted on a leg, FIG. 3 is a cross-sectional view along line 3—3 in FIG. 2, and FIG. 4 is an isometric view showing a socket according to another embodiment of the invention.

DETAILED DESCRIPTION OF THE PREFERRED EMBODIMENT

Figure 1:
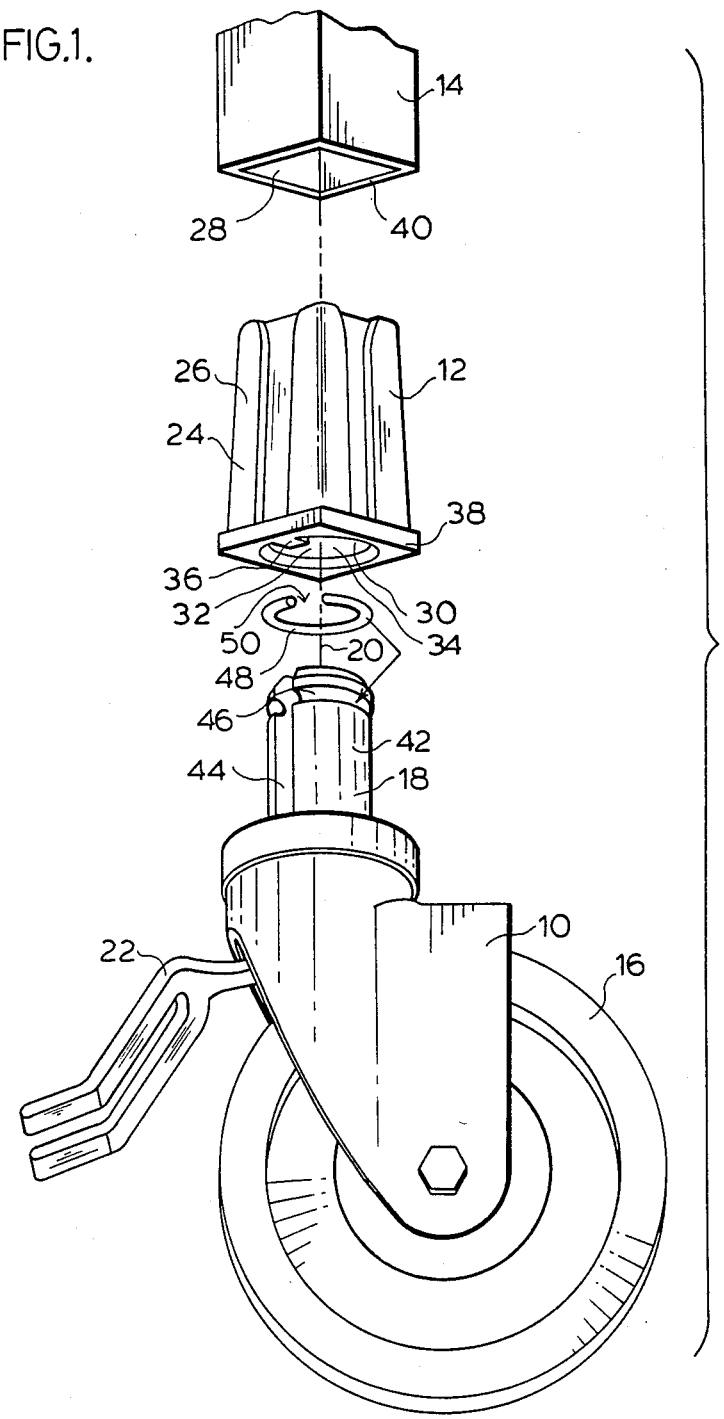
FIG. 1 is an exploded isometric view showing the assembly according to one embodiment of the invention.

Reference is first made to FIG. 1 which shows the assembly including a caster 10 and a socket 12 to be mounted on the bottom of a hollow leg 14 of a furniture piece, such as a hospital bed. The caster 10 has a wheel 16 which rotates about a horizontal axis and a generally cylindrical stem 18 which extends along a generally vertical axis 20 which extends centrally through the socket 12 and the leg 14. In addition to the wheel 16 rotating, the caster 10 also has a bearing mechanism which allows the wheel to swivel around the vertical axis 20 through the stem 18. As mentioned above, the caster 10 also has a braking mechanism which the operator can actuate by pressing the brake fork arm 22 to prevent the wheel from rotating or swiveling relative to the stem 18. This mechanism which engages the wheel 16 and the bottom of the stem 18 is well known in the art and need not be described in detail. Examples of this type of lockable swivel casters are shown in U.S. Pat. Nos. 4,035,864 and 4,385,414 referred to above.

The socket 12 has a body 24 and an outer surface 26 which is made to fit tightly in the opening 28 in the square tubular leg 14. The body 24 of the socket 12 also has an inner surface 30 which forms a generally cylindrical central hole as well 32 with a downwardly open mouth 34. The inner surface 30 of the body 24 also forms a key 36 which projects into the well 32. In this embodiment, the socket 12 is formed of die cast zinc and the key 36 is a rectangular rib which extends vertically along the side of the well 32. The body 24 of the socket 12 also has a flange portion 38 which projects outwardly adjacent the mouth 34 of the well 32. When the socket 12 is inserted into the opening 28 in the leg 14, the flange portion abuts against the lower rim 40 of the leg 14.

As may be seen, according to the invention, the stem 18 of the caster 10 has a generally cylindrical outer surface 42 in which a longitudinal groove 44 is machined to receive the key 36 when the stem 18 is inserted into the well 32 in the socket 12. The engagement of the key 36 in the groove 44 prevents the stem 18 of the caster 10 from rotating in the well 32. The outer surface 42 of the stem 18 also has a circumferential groove 46 which receives a resilient split ring 48 formed of spring steel. The outer diameter of the ring 48 is sufficiently larger than the diameter of the stem 18 whereby the ring resiliently abuts against the inner surface 30 of the body 24 when the stem 18 is forced into the well 32. This contact is sufficient to retain the stem 18 in place in the socket 12, although it is easily removable for repair or replacement.

In use, the socket 12 is press fitted into the opening 28 in the leg 14. The resilient split ring 48 is seated in the circumferential groove 46 with the opening 50 in the ring aligned with the longitudinal groove 44. The longitudinal groove 44 is then aligned with the key 36 and the stem 18 of the caster 10 is forced into the well 32 in the socket 12. As seen in FIG. 2, the weight of the bed will force them to a position where the rim 40 of the leg 14 abuts against the flange portion 38 of the socket which is, in turn, supported by a shoulder 52 on the caster 10. The resilient contact of the split ring 48 against the inner surface 30 of the socket body 24 prevents the caster 10 from falling out of place when the bed is lifted, but makes it easily removable. In this position, the socket 12 is securely seated in the hollow leg 14 and the key 36 and groove 44 engagement between the stem 18 and socket 12 prevents rotation between them. Thus, when the braking mechanism is actuated by fork arm 22, the wheel 16 is firmly secured against swiveling around the vertical axis 20. This is achieved in a very economical manner with a minimum of changes from existing assemblies, yet it significantly improves the method of assembly and facilitates replacement of the caster.

FIG. 4 shows an alternate embodiment of the invention in which the outer surface 26 of the socket body 24 has a different shape to be securely received in a hollow leg 14 having a cylindrical shape. Otherwise, the embodiment is the same as the above first embodiment and need not be described further.

Although the description of this invention has been given with respect to particular embodiments, it is not to be construed in a limiting sense. Variations and modifications will occur to those skilled in the art. For instance, it will be apparent that the socket 12 can have various shapes, and that the key 36 need not necessarily be a rectangular rib. For a definition of the invention, reference is made to the following claims.

What I claim is:

1. An improved rotatable support assembly for mounting on the bottom of a generally vertical hollow leg comprising:
   (a) a caster having an upwardly projecting elongated generally cylindrical stem with an upper end and a wheel which rotates and swivels relative to the stem, the stem having an outer surface with a groove extending longitudinally from its upper end, the caster including brake means which are lockable to prevent the wheel swiveling relative to the stem and
   (b) a socket having a body with an outer surface and an inner surface which defines a generally cylindrical central hole with a downwardly open mouth, the body having a key which projects into the hole, the body being receivable in the hollow leg wherein the outer surface frictionally engages the hollow leg to secure the socket in place, the stem of the caster being removably receivable by a force fit in the hole in the socket with the key received in the longitudinal groove in the stem whereby the stem is prevented from rotating in the hole, the stem of the caster being easily removable by only applying a downward force on the caster to disengage the force fit.

2. An assembly as claimed in claim 1 wherein the leg has a lower rim and the socket has a flange portion which projects outwardly adjacent the mouth of the hole and abuts against the lower rim of the leg when the socket is received in place in the hollow leg.

3. An assembly as claimed in claim 2 wherein the inwardly extending key on the body of the socket is a longitudinally extending rib which is received in the longitudinal groove in the stem when the stem of the caster is received in place in the hole in the socket.

4. An assembly as claimed in claim 1 wherein the outer surface of the stem also has a circumferential groove, and further including a resilient split ring seated in the circumferential groove, the split ring having a diameter sufficiently larger than the diameter of the stem whereby the split ring resiliently abuts against the inner surface of the body to longitudinally retain the stem in place when the stem of the caster is inserted into the hole in the socket.

5. An assembly as claimed in claim 4 wherein the hole in the body of the socket is a well with a closed upper end.

6. An assembly as claimed in claim 5 wherein the outer surface of the body of the socket is shaped to be received in a hollow leg with a square opening.

7. An assembly as claimed in claim 5 wherein the outer surface of the body of the socket is shaped to be received in a hollow leg with a circular opening.

8. An assembly as claimed in claim 5 wherein the socket is made of die cast zinc.

* * * * *